Sept. 25, 1962 C. T. CRAMPTON 3,055,521
POWER ACTUATED GRAPPLE FORK LOADER
Filed Feb. 17, 1959 2 Sheets-Sheet 1

Inventor
CARL T. CRAMPTON

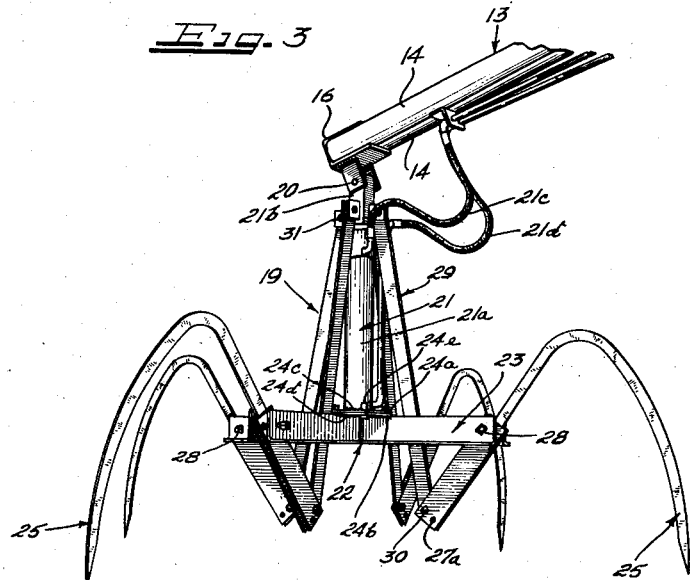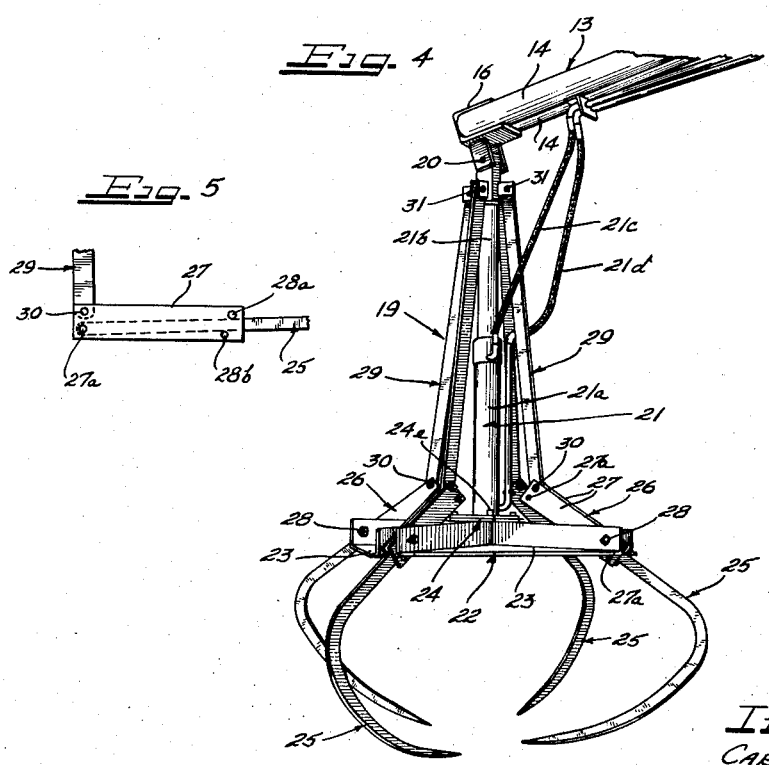

či 3,055,521
Patented Sept. 25, 1962

3,055,521
POWER ACTUATED GRAPPLE FORK LOADER
Carl T. Crampton, Sioux Falls, S. Dak., assignor to Du-Al Manufacturing Company, Sioux Falls, S. Dak., a corporation of South Dakota
Filed Feb. 17, 1959, Ser. No. 793,868
7 Claims. (Cl. 214—147)

The present invention concerns generally a grappling device. More particularly, the present invention relates to a grapple which is adapted to be mounted on a boom structure carried by a tractor or the like which boom and grapple are preferably provided with hydraulic cylinders for controlling the operation of the grapple from the driver's seat on the tractor.

The instant grapple fork loader structure includes a centrally located hydraulic cylinder structure which cylinder structure includes a piston rod which is pivotally connected to the boom carried on a vehicle. A frame is mounted on the cylinder. A series of grapple hooks are pivotally connected with links and with the frame, the links being also pivotally connected to the piston rod. During the operation of the aforesaid structure, the cylinder and the frame are movable towards and away from the boom to cause the grapple hooks to pivot relative to the frame and the links in the actuation of the grapple hooks back and forth into open and closed position.

According to certain features of the present invention, the pivotal connections between the above described links and the grapple hooks are disposed radially inwardly of the pivotal connection between the grapple hooks and the frame.

According to still other novel features of the present invention, there is provided a new and improved frame structure comprised of a series of angular plates each having angled margins with the margins of the adjacent plates being circumferentially spaced in confronting relation with respect to one another and with the grapple hooks each being disposed in one of the spaces between the angled margins in pivotal assembly therewith.

Accordingly, an important object of the present invention is to provide a new and improved grapple fork loader structure for suspension from a boom mounted on a vehicle such as a tractor.

Still another important object of the present invention relates to the provision of a new and improved grapple fork loader structure which may be economically manufactured and which may be used for long periods of time requiring only that the pivots be periodically greased.

Still another important object of the present invention relates to a novel grapple fork loader which is adapted to more efficiently load and unload materials such as hay.

Other objects and features of the present invention will more fully become apparent in view of the following detailed description taken in conjunction with the accompanying drawings showing a single embodiment, and in which:

FIGURE 3 is an enlarged fragmentary side view of the grapple fork loader structure showing the grapple forks in an open position;

FIGURE 4 is an enlarged fragmentary side view similar to FIGURE 3 only illustrating the forks in a closed position; and FIGURE 5 is an enlarged detail view showing a modified form of securing the hooks to the frame structure.

As shown on the drawings:

Figure 1:
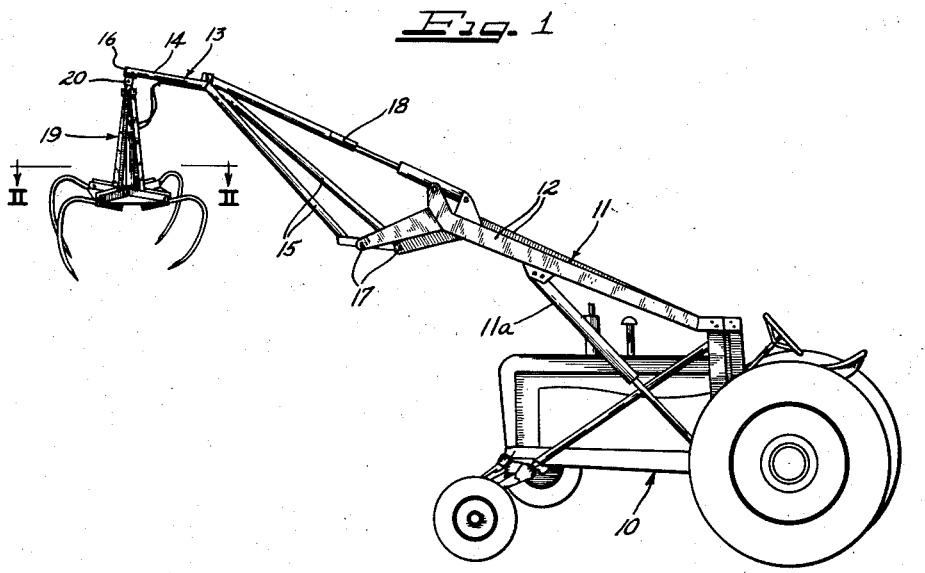
FIGURE 1 is generally a side view showing a tractor having a boom structure from which the grapple fork loader is suspended.
Figure 2:
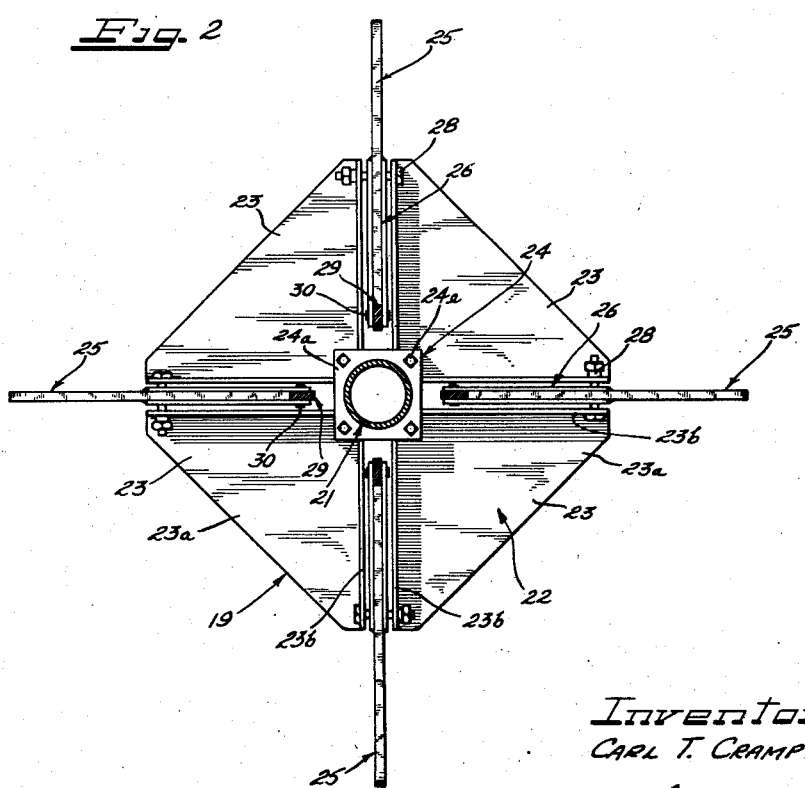
FIGURE 2 is an enlarged cross-sectional view, with parts shown in elevation, with the section being taken substantially on the line II—II looking in the direction indicated by the arrows, as appearing in FIGURE 1.

The reference numeral 10 in FIGURE 1 identifies a conventional tractor which tractor has a boom structure 11 mounted thereon. The boom structure may be lowered or elevated in the operation of a hydraulic cylinder 11a by means of manipulating controls (not shown) which are preferably located adjacent the driver's seat.

The boom structure 11 includes a first pair of boom arms 12, 12 and a fork structure 13. The fork structure 13 is comprised of a pair of rods each of which includes a base portion 14 and an angled portion 15. The base portions 14 are secured together by means of a welded angle bracket structure 16 and the angled portions are arranged in diverging relation and are disposed in pivotal assembly with the boom arms 12, 12, as indicated at 17, 17. The fork 13 and the arms 12 may be pivoted relative to one another by the operation of a hydraulic cylinder as indicated at 18 which cylinder structure is mounted between the fork 13 and the arms 12.

Carried upon the boom 11 is a grapple fork loader structure 19 which embodies principles of the present invention and is pivotally connected at 20 with the angle structure 16 disposed on the fork 13.

The grapple fork loader structure 19 includes a hydraulic cylinder structure 21 having a cylinder 21a and a piston rod 21b which piston rod 21b is disposed vertically above the cylinder casing 21a and is held in pivotal assembly with the boom 11 by means of the pivotal connection 20. Fluid lines 21c and 21d are connected to a hydraulic fluid system (not shown) for causing relative movement between the cylinder 21a and the piston rod 21b. Suitable controls may be provided at the driver's seat on the tractor for facilitating operation of the grapple fork loader structure 19.

Disposed coaxially of the cylinder structure 21 but below the cylinder 21a is frame means or a frame structure 22.

The frame structure 22 includes a series of angular plates 23 each having an angular or triangular base plate portion 23a and angular margins 23b. The angular margins 23b, 23b on each of the plates 23 are disposed at right angles with respect to the base plate portion 23a and are disposed at right angles with respect to one another.

Disposed between the cylinder 21a and the frame 22 is means 24 for maintaining the frame and the cylinder in assembly together. The means 24 comprises a cylinder top plate 24a and a frame lower plate 24b with the top plate 24a being in welded assembly with the cylinder 21 as indicated at 24c and with the lower plate 24b being in welded assembly with the angular plates 23 as indicated at 24d. The weld 24c operates to sustain the plates 23 in assembly together. Fasteners 24e are provided for securing the top and lower plates 24a and 24b in assembly together.

Four angular grapple hooks 25 are provided for assembly with the frame 22. Holder plate structure 26 is provided for each of the hooks 25 to assist in the assembly of the hooks 25 with the components of the grapple fork loader structure 19. The holder plate structure 26 is comprised of a pair of plates 27 and a pair of fasteners 27a, 27a are provided for securing the plates 27 in assembly with the associated grapple hook 25.

The grapple hooks 25 along with their associated holder plate structures 26 are each disposed circumferentially about the vertical axis of the hydraulic cylinder structure in the circumferentially spaced gaps disposed between the vertically turned angular margins 23b and are secured in assembly with the frame 22 by means of a series of pivotal connections 28. The pivotal connections 28 each comprise a nut and bolt assembly.

Circumferentially spaced links 29 are provided which together comprise linkage for connecting the hydraulic cylinder structure 21 with the grapple hooks 25. To this end, each of the links 29 has its vertically lower end pivotally engaged at 30 with one of the grapple hooks 25. The vertically upper end of each of the links 29 is connected to the piston rod 21b by means of a pivotal connection 31. It will be appreciated the links 29 are also arranged circumferentially with respect to the longitudinal axis of the hydraulic cylinder structure 21. It will further be appreciated that the pivots 28 and 30 are circularly arranged radially of the longitudinal axis of the hydraulic cylinder structure and that the pivots 28 are disposed radially outwardly of the pivots 30.

Upon the operation of the hydraulic cylinder structure 21 the cylinder 21a and the frame 22 are caused to move towards and away from the boom 11 depending upon which control is operated to cause the grapple hooks 25 to pivot relative to the frame on their pivots 28 and to pivot relative to the links 29 on their pivots 30 to cause the grapple hooks 25 to move back and forth into open and closed positions. During the operation of the hydraulic cylinder structure 21 the pivots 28 will be caused to move vertically relative to the relatively fixed pivots 30 so that when the grapple hooks 25 are in an open position, the pivots 28 are disposed above the pivots 30 whereas when the grapple hooks 25 are disposed in a closed position, the pivots 28 will be disposed vertically below the pivots 30.

In summary, the instant loader 10 may be operated in such a way that the frame segments 23 may be loaded down onto the top of a haystack into a position where the segments are horizontally deposited on top of the haystack. Then by manipulating the hydraulic valve and turning on the hydraulic pressure the hydraulic cylinder may be caused to move vertically downwardly on the piston rod away from the boom. By reason of the fact the cylinder is integral with the frame segments 23, the downward movement of the cylinder causes the C-shaped hook 25 to move inwardly in clam shell-like manner to grip the hay.

As shown in FIGURE 5 is a modified form of the present invention wherein each of the hooks 25 is pivotally connected to its associated plates 27 at 27a and is confined between nut and bolt assemblies 28a and 28b which bear against the vertically upper and lower edges of the associated hook 25. By this construction, the hooks 25 may be assembled or replaced merely by assembling or removing the nut and bolt assembly 27a.

It will be understood that modifications and variations may be effected without departing from the scope of the novel concepts of the present invention.

I claim as my invention:

1. In a grapple fork loader structure including a boom mounted on a vehicle, a hydraulic cylinder structure including a piston rod and a hydraulic cylinder, the piston rod being pivotally connected to the boom, a frame carried on said cylinder, linkage including a series of links pivotally connected to the piston rod, a series of grapple hooks pivotally connected with the linkage and with the hooks being in an open position when the piston rod is in a retracted position and with the hooks being in a closed grappling position when the piston rod is in an extended position, said frame comprising a series of angular plates having angled margins on each of the plates, said angular plates being arranged radially of the longitudinal axis of the hydraulic cylinder and being secured in assembly therewith, the angled margins on adjoining plates being spaced in confronting relation and with said grapple hooks being secured in pivotal assembly between the angled margins on the adjoining plates.

2. In a grapple fork loader structure including a boom mounted on a vehicle, a hydraulic cylinder structure including a piston rod and a hydraulic cylinder, the piston rod being pivotally connected to the boom, a frame carried on said cylinder, linkage including a series of links connected to the piston rod, a series of four grapple hooks pivotally connected to the links and to the frame, the cylinder and the frame being movable towards and away from said boom and thereby causing the grapple hooks to pivot relative to the frame and the links in the actuation of the grapple hooks back and forth into open and closed positions, said frame comprising four angular plates each having angled margins, the margins of the adjacent plates being circumferentially spaced about the cylinder in confronting relation with respect to one another and with the grapple hooks each being disposed in one of the spaces between the angled margins in pivotal assembly therewith, and means connecting the plates with the cylinder.

3. In a grapple fork loader structure including a boom mounted on a vehicle, a hydraulic cylinder structure including a piston rod and a hydraulic cylinder, the piston rod being pivotally connected to the boom, a frame carried on said cylinder, linkage including a series of links having pivotal connections joining the links to the piston rod, a series of grapple hooks having pivotal connections joining the hooks to the links and with the hooks being pivotally connected to the frame, the cylinder and the frame being movable towards and away from said boom and thereby causing the grapple hooks to pivot relative to the frame and the links in the actuation of the grapple hooks back and forth into open and closed positions, said frame comprising angular plates each having angled margins, the margins of the adjacent plates being circumferentially spaced about the cylinder in confronting relation with respect to one another and with the grapple hooks each being disposed in one of the spaces between the angled margins in pivotal assembly therewith, and means connecting the plates with the cylinder, the pivotal connections between the links and the grapple hooks being disposed radially inwardly of the pivotal connections between the grapple hooks and the frame.

4. In a grapple fork loader structure including a boom mounted on a vehicle, a hydraulic cylinder structure including a piston rod and a hydraulic cylinder, the piston rod being pivotally connected to the boom, a frame carried on said cylinder, linkage including a series of links connected to the piston rod, a series of grapple hooks pivotally connected to the links and to the frame, the cylinder and the frame being movable towards and away from said boom and thereby causing the grapple hooks to pivot relative to the frame and the links in the actuation of the grapple hooks back and forth into open and closed positions, said frame comprising angular plates each having angled margins, the margins of the adjacent plates being circumferentially spaced about the cylinder in confronting relation with respect to one another and with the grapple hooks each being disposed in one of the spaces between the angled margins in pivotal assembly therewith, and means connecting the angular plates with the cylinder, said means comprising a pair of plates one of which is fixedly secured to the angular plates and the other of which is fixedly secured to the cylinder, the plates being secured in assembly by fasteners.

5. In a grapple hook loader structure for a boom mounted on a vehicle such as a tractor, a fluid cylinder structure including a piston rod and a fluid cylinder, the piston rod being adapted to be pivotally connected to the boom at its remote end from the fluid cylinder, a frame carried on said cylinder, a multiplicity of grapple hooks annularly spaced about the cylinder and pivotally connected to the frame in an orbit spaced radially outwardly of said cylinder, and a series of annularly arranged links disposed in frusto-conical relation about the cylinder structure, each of the links being pivotally connected at one end to said piston rod adjacent its remote end and having a pivotal connection at its opposite end joining the link with one of said grapple hooks, the pivotal connections being arranged in an orbit radially spaced from the cylinder structure permitting the grapple hooks to be freely pivoted in unison on the frame upon the actuation of the piston rod and with the remote end of the piston rod being extended away from the cylinder when the hooks are in a closed position, said frame comprising a series of angular plates having angled margins on each of the plates, said angular plates being arranged radially of the fluid cylinder and being secured in assembly therewith, the angled margins on adjoining plates being spaced in confronting relation and with said grapple hooks extending between said angled margins and secured in assembly with the adjoining plates by means of the pivotal connections.

6. In a grapple fork hay loader structure adapted to be mounted on a boom on a vehicle, a fluid cylinder structure including a piston rod and a fluid cylinder, the piston rod being pivotally connected to the boom, a cylinder having a base plate, a rectangular frame comprising a series of circumferentially spaced plates fixedly attached to said base plate, linkage including a series of links connected to the piston rod, a series of grapple hooks pivotally connected to the links and said plates and disposed in spaces between the spaced plates, the cylinder and the frame being movable towards and away from said boom and thereby causing the grapple hooks to pivot in said spaces between said plates relative to the frame and the links in the actuation of the grapple hooks back and forth into open and closed position, and slots between the plates at corners of said rectangular frame with said grapple hooks disposed in the slots, each of said grapple hooks being secured in pivotal assembly intermediate its ends with the plates associated therewith.

7. In a grapple fork hay loader structure adapted for suspension from a boom carried on a vehicle, a fluid cylinder structure including a piston rod and a fluid cylinder, a frame secured to a lower end of said cylinder and with the frame having a series of circumferentially spaced radially outwardly extending slots, a series of grapple hooks in said slots, a series of grapple hook holder plate structures in said slots and with each of said hooks being fixedly attached to one of said holder plate structures in removable assembly for ready replacement of a damaged grapple hook, the holder plate structures being pivotally connected to said plates for rocking movement in said slots, linkage including a series of links each pivotally connected to said piston rod at an upper end and to one of said holder plate structures at a lower end but radially inwardly of the pivotal connection between the holder plate structures and said plate, the cylinder and the frame being movable away from the piston rod causing said grapple hooks to pivot from an open to a closed position.

References Cited in the file of this patent

UNITED STATES PATENTS

| | | |
|---|---|---|
| 476,750 | Lambing | June 7, 1892 |
| 584,880 | Knox | June 22, 1897 |
| 623,065 | Barrett | Apr. 11, 1899 |
| 2,591,431 | Henggeler | Apr. 1, 1952 |
| 2,676,837 | Wagner et al. | Apr. 27, 1954 |
| 2,696,926 | Squires et al. | Dec. 14, 1954 |
| 2,717,705 | Jacobson | Sept. 13, 1955 |
| 2,877,575 | Stedt | Mar. 17, 1959 |
| 2,908,526 | Nelson | Oct. 13, 1959 |